United States Patent Office 3,474,062
Patented Oct. 21, 1969

3,474,062
PARTIALLY LACTONIZED POLYMERS OF POLY-(METHYL PROPENOL/METHACRYLIC ACID)
Wayne E. Smith, Shawnee, Kans., Harry D. Anspon, Kansas City, Mo., and George E. Ham, Jr., Overland Park, and Dru W. Alwani, Merriam, Kans., assignors to Gulf Oil Corporation, Pittsburgh, Pa., a corporation of Pennsylvania
Filed June 24, 1965, Ser. No. 466,793
Int. Cl. C08f 27/12, 27/24, 27/22
U.S. Cl. 260—30.4
5 Claims

ABSTRACT OF THE DISCLOSURE

Film, coatings, filaments, foils, ribbons and the like are cast or spun from solutions of partially lactonized poly-(methyl propenol/methacrylic acid) substantially free of aldehyde and acetal groups. The polymers are prepared in a two-stage process under controlled conditions of temperature wherein polymethacrolein is reacted with a strong base at a pH of 8 or above at a temperature of at least about 125° C., then in the second stage of the process acidified with a nonoxidizing mineral acid at a temperature between about 30° and 150° C. to lactonize adjacent hydroxyl and carboxylic acid groups. The resulting polymers have an inherent viscosity of from 0.1 to 3.0 dl./gm. as determined in dimethyl formamide at 30° C., are soluble in tetrahydrofuran and contain between about 20 to about 90 mol. percent of repeating lactone groups, and between about 5 to about 40%, of repeating methyl propenol and methacrylic acid units.

---

Figure 1:
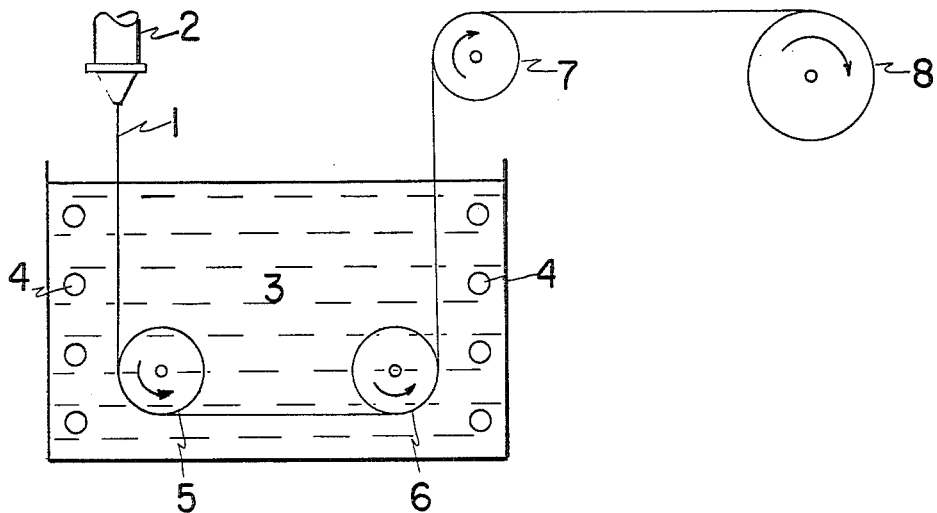

This invention relates to the modification of polymethacrolein derivatives and, more particularly, to the preparation of shaped structures such as films, coatings, foils, filaments, ribbons, and the like, from derivatives of polymethacrolein.

Various methods of polymerizing methacrolein are known. Among these procedures there are, for example, mass polymerization, suspension polymerization, and emulsion polymerization systems. The resultant products are polymers in which some of the aldehyde groups cyclicize to acetal groups to provide basic repeating units of the structures

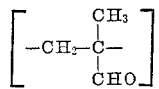

and

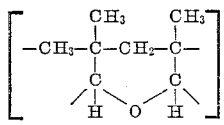

the aldehyde and cyclic acetal groups of which can be utilized to prepare polymethacrolein derivatives.

Processes for the preparation of polymethacrolein derivatives by Cannizzaro-type reactions are also known. These Cannizzaro-type reactions products can be prepared by reacting polymethacrolein, such as in the form of an emulsion, with a base at a pH of 8 or more. Typical bases include water soluble alkali metal hydroxides, such as sodium, potassium and lithium hydroxides, and strong organic bases such as diisobutyl and tertiary amines.

These Cannizzaro-type reactions reduce part of the aldehyde and acetal groups of the methacrolein polymer to hydroxyl groups and oxidize another equivalent part of the aldehyde and acetal groups to carboxyl groups which, in turn, react with the base to form the corresponding polymer salts heretofore characterized by containing substantial amounts of unreacted residual aldehyde and acetal groups.

These Cannizzaro-type reaction products, which can be designated as poly(methyl propenol/methacrylic acid salts) are readily soluble in water and contain recurring units of the structures

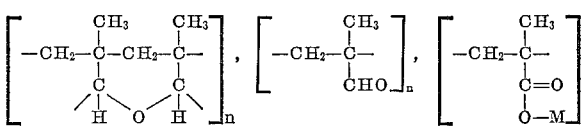

and

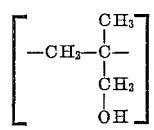

where M is a cation of the base employed and $n$ is an integer.

These Cannizzaro-type reaction products readily react with acids to yield the acid form thereof, e.g. poly(methyl propenol/methacrylic acid/methacrolein), having repeating units of the structures

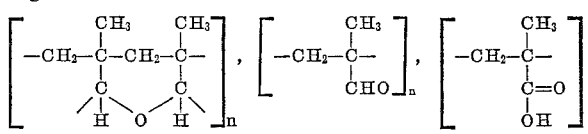

and

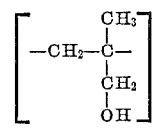

The free acid is readily converted into a lactone on heating and drying as illustrated below, disregarding, for convenience, the presence of acetal groups.

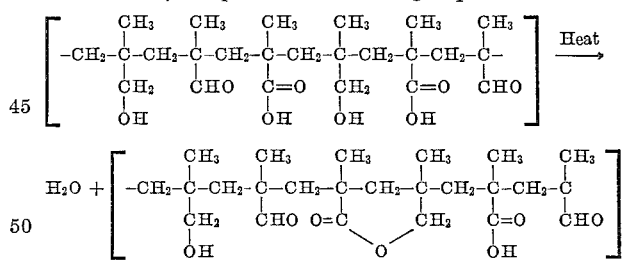

Heretofore, no utility has been known for the lactone, and its formation has been generally avoided. These prior art lactones were found to be insoluble in water, insoluble in bases and acids, and were characterized by poor physical properties which have prevented their use for any known purpose.

It has now been discovered that valuable shaped structures, such as film, coatings, filaments, foils, ribbons, and the like, can be obtained from solutions of partially lactonized polymers of poly(methyl propenol/methacrylic acid) which are substantially free of aldehyde and acetal groups and which have been derived in a two-stage process and under controlled conditions of temperature from polymethacroleins having an inherent viscosity of from 0.1 to 3.0 dl./gm. as determined in dimethylformamide at 30° C. These partially lactonized poly(methyl propenol/methacrylic acid) polymers prepared by such two-stage processes are characterized by solubility in tetrahydrofuran and contain, based on the ploymer, between about 20 to about 90 mole percent of repeating lactone groups having the structure, including mirror images thereof,

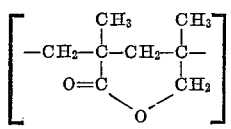

and between about 5 to about 40 mole percent, each, of repeating methyl propenol and methacrylic acid units having, respectively, the following structures

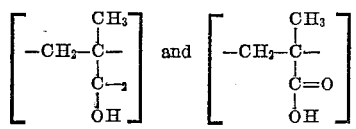

The molecular weights of these partially lactonized polymers will correspond to that of the base polymethacrolein employed and, in general, the more practical of these partially lactonized polymers are characterized by an inherent viscosity of about 0.1 to about 3.0, and, preferably, from about 0.5 to about 2.0, as determined in dimethylformamide at 30° C.

It was found that the preparation of the partially lactonized polymers of this invention is critical since any deviation from such a two-stages process, as described below, will result in products containing substantial quantities of aldehyde groups and/or deterioration of properties.

In contrast, by adhering to the limitations of this invention, unique products are obtained which are transparent and have high grade physical properties and appearance. More particularly, the products have, among other properties, high clarity, high density, and excellent physical properties such as tensile strength, hardness and elongation.

The partially lactonized poly(methyl propanol/methacrylic acid) polymers of this invention are obtained by a two-stage process wherein the first stage involves the preparation of Cannizzaro-type intermediate products by reacting polymethacrolein with a strong base, such as identified above, at a pH of 8 or above, in a suitable liquid medium which is preferably a solvent for the final and desired products obtained in the subsequent and second stage of the process. A typical and preferred reaction medium for the Cannizzaro-type reaction is water. The temperature of this first-stage reaction is critical, and it is essential that the reaction be carried out at a temperature of at least about 125° C. Where a reaction medium, such as water, is used having a boiling point below 125° C., this first-stage reaction will be effected under a pressure sufficient to prevent boiling off of the medium. It was found that this first-stage reaction must be carried out at a temperature of at least about 125° C. in order to completely convert the aldehyde and acetal groups of the base polymethacrolein to a corresponding equal number of hydroxyl and carboxylate groups, and that where lower temperatures are employed the resultant first-stage products will contain substantial quantities of residual aldehyde and acetal groups.

The poly(methyl propenol/methacrylic acid salt) products, of the first-stage Cannizzaro-type reaction, are substantially free of aldehyde and acetal groups and will contain repeating units having the structures

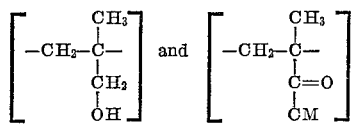

wherein M is a cation corresponding to the cation used, and will normally be a monovalent cation such as $NH_4^+$, $Na^+$, $K^+$, $Li^+$, and the like.

The second stage of the process is an acidification step which involves reacting the first-stage reaction products with a nonoxidizing mineral acid at a temperature of at least about 30° C. which normally will be about 30° C. to about 150° C., and preferably from about 30° C. to about 100° C., to lactonize adjacent hydroxyl and carboxylic acid groups. The resultant product is a terpolymer comprising a partially lactonized polymer of poly(methyl propenol/methacrylic acid) consisting essentially of from about 20 to about 90 mole percent, based on the terpolymer, of repeating lactone groups having the structure

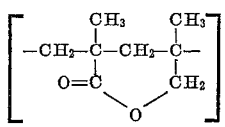

and from about 5 to about 40 mole percent each of repeating units of methyl propenol and methacrylic acids having the following respective structures

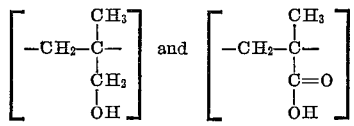

These partially lactonized poly(methyl propenol/methacrylic acid) terpolymers will have an inherent viscosity in the range of about 0.1 to 3.0 as measured at 30° C. at a concentration of 0.1 percent by weight of the polymer in a suitable solvent.

It is essential that the second stage acidification step be effected at least at a temperature of 30° C. It was found that the degree of lactonization, during the acidification step, initially decreases to a minimum with increasing temperatures, followed by an increasing degree of lactonization as the temperature of the acidification is further increased, so as to provide significantly distinct products. It was found that lactonized polymers of poly(methyl propenol/methacrylic acid) containing 69.0 mole percent of the above-defined lactone units were obtained at an acidification temperature of 0–5° C., with such polymers being practically insoluble in tetrahydrofuran at room temperature. Similarly, lactonized polymers of poly(methyl propenol/methacrylic acid) containing 25.1 mole percent of the above-defined lactone units were obtained at an acidification temperature of 24–25° C., the resultant polymers also being essentially insoluble in tetrahydrofuran at room temperature. However, when the acidification step was carried out at 50–55° C., the partially lactonized poly(methyl propenol/methacrylic acid) polymers of this invention were obtained containing 66.0 mole percent of the above-defined lactone groups, and which were completely soluble in tetrahydrofuran at room temperature.

The polymethacrolein polymers employed in this invention can be prepared by any suitable method such as, for example, mass polymerization, suspension polymerization, and emulsion and solution polymerization. These methacrolein polymers can be obtained in a wide range of molecular weights which can be controlled by selection of the specific method employed and/or modification in the parameters of the method employed.

These partially lactonized second-stage products can be readily cast into sheet, film, and coatings from solutions in organic solvents, to form transparent and pliable products of excellent physical strength which can be used for the preparation of protective coverings, fabrication of packaging films, and the like. Conventional equipment can be used in the casting of the second-stage product from a solution thereof onto a support or casting surface, i.e. glass or Teflon-coated base, and in evaporating the solvent. However, it is essential that the casting solution and evaporation of solvent from the cast coating be maintained at a temperature not exceeding about 200° C. in order to avoid intermolecular modification of the polymer.

In general, any conventional volatile solvent can be used in preparing the casting solution as, for example, dimethylformamide, tetrahydrofuran, Carbitol, and the like. For all practical purposes, any volatile organic solvent may be used which forms the desired polymer solution. The casting solution can normally be prepared by dissolving the second-stage polymer product in the solvent and the solution heated to about the boiling point of the solvent, but in all events not above about 200° C. These casting solutions will generally have a polymer solids content of about 10 to about 50 mole percent and normally about 15 to about 35 percent solids. Normally, the concentration of the polymer in the solution will be dictated by practical consideration, such as economics of the solution casting operation, i.e. rate of solvent evaporation, molecular weight of the dissolved polymer, dimension of the film or sheet cast, thermal considerations, and the like.

If desired, various additives may be employed in the casting solution for modification of the solution and/or of the cast product. Thus, it may be desirable for various purposes to modify the polymeric compositions of this invention by the presence of other materials such as, for example, pigments, dyes, plasticizers, color stabilizers, etc.

Shaped products can also be prepared from spinning solutions of these partially lactonized second-stage products.

In one method of preparing shaped products from solutions, a spinning solution containing the second-stage partially lactonized polymer is extruded through a shaped orifice into a coagulating bath which coagulates the extrudate, by extraction of solvent from the spinning solution, in the form of an often white film, ribbon, fiber, or filament corresponding to the configuration of the shaped orifice. The extrudate is normaly passed through the bath for a distance sufficient to insure substantially complete coagualtion of the desired product, removed from the bath, washed and wound on a suitable reel for either storage or drying which, as indicated above, is accomplished by heating the resultant product at a temperature not greater than about 200° C. This produces a transparent product having excellent physical properties. Alternately, the coagulated extrudate, upon removal from the coagulating bath, may be passed to a drying station prior to collection for storage and/or use, as, for example, preparation of protective covering or packages from the film, manufacture of fabrics from the fibers, and the like.

In general, the properties of these shaped and dried products can be improved by heating them to a temperature of about 100° C. to about 200° C. (depending upon the amount of residual solvent present) and stretching them under tension so as to produce orientated products having high tensile strengths. Normally, these shaped structures will be elongated from about 25 to about 200 percent of their initial length. However, the specific and optimum temperature to be used for elongating the shaped structures depends on various factors such as the molecular weight of the structure, its specific composition (i.e. degree of lactonization), prior history of preparation, shape and thickness of the structure, working speed and the like. Accordingly, the optimum temperature for elongation of the structure can be determined by a series of simple tests. It is to be understood that temperatures for stretching can be employed for specialty items which are outside the range indicated above.

Conventional equipment can be used for heat-stretching of the shaped structures. For example, films and filaments may be stretched by means of rolls running at different speeds, of which one of the upstream rolls may be heated or, alternately, a heating means such as a heating plate or chamber can be interposed between one of the stretching rolls. Also, a series of rolls having increasing draw speeds may be used with heating devices suitably disposed between roll units. Films may also be stretched by inflating tubular structures and subsequently cutting them open.

Normally, for spinning of filaments, the concentration of the solution for practical purposes will generally be adjusted to a viscosity of about 4,000 to about 12,000 centipoises normally corresponding to a solids concentration of the lactonized polymer of about 10 to 50 percent. In general, solutions of higher viscosities can be spun more easily, and the particular viscosities best suited for each operation selected as desired.

Similarly, in the casting of films from solutions, the concentration of the solutions is preferably adjusted, for convenience, to provide a relatively low viscosity of about 300 to about 2,500 centipoises, particularly for the purpose of reducing the amount of solvent to be evaporated.

In general, as will be apparent to those skilled in the art, any volatile solvent for these second-stage partially lactonized polymers can be used in preparing the spinning solution as, for example, dimethylformamide, tetrahydrofuran, etc. Normally, the solvents will be organic in nature and capable of being evaporated without decomposition. For all practical purposes, any volatile organic solvent may be used which forms the desired polymer solution and which has the desired stability. The spinning solution can normally be prepared by dissolving the partially lactonized polymer in a suitable solvent, such as dimethylformamide, tetrahydrofuran, and the like, and the solution normally heated to between about 30 to 150° C., and preferably about 30 to 100° C.

The temperatures of the spinning solution and coagulating bath must also be controlled in order to obtain products compatible with this invention, since the increased temperatures are accompanied by increased degrees of lactonization of the polymer. For these reasons, it is essential that the temperature of the spinning solution and coagulating bath does not exceed about 200° C. Also, control of the spinning solution and coagulating bath provides a convenient means to increase the amount of lactonization of the polymer within the parameters set forth in this invention. It was found that the second-stage partially lactonized polymer is susceptible, even after formation thereof, to further lactonization with increased temperatures. Thus, if further lactonization is desired in the second-stage polymer, it is only necessary to adjust the temperature of the spinning solution and/or the coagulating bath to obtain the desired increase in lactonization. The specific temperatures of the solution and/or bath can be readily determined by relatively simple tests or, for example, by gradually increasing the temperature of the solution and/or bath until the amount of lactonization desired is obtained.

Generally, these spinning solutions will have a partially lactonized polymer solids content of about 10 to 50 mole percent and normally about 15 to 35 percent solids depending on the molecular weight of the partially lactonized polymer. For practical purposes, the concentration of the lactonized polymer in the solution should be such as to provide a sufficient viscosity to the solution for convenient extrusion or spinning thereof. Normally, the viscosity of the solution will be in the range of 4,000 to 12,000 centipoises.

If desired, various spinning agents may be employed in the spinning solution for control thereof in extrusion, i.e. viscosity, and the like, as is conventional in the art. Also, it may be desirable for various purposes to modify the polymeric compositions of this invention by the presence of other materials, such as, for example, pigments, dyes, plasticizers, color stabilizers, spinning, etc.

In general, the coagulating bath comprises the liquids, conventional in the art, which are non-solvents for the coagulating polymer but miscible with the solvent of the spinning solutions. Typical coagulating baths can comprise water, aqueous solutions containing spinning agents, organic solvents, and the like. During the operation, the coagulating bath (which is generally water) into which the solution is extruded will build up its solvent content during the process due to extraction of the solvent from the solution. The solvent which builds up in the coagulating bath can be continuously removed, for recovery of the spinning solvent, during the process by removing a portion of the bath and adding thereto like quantities of fresh liquid to the bath. In general, the solvent extracted in the coagulating bath will be maintained at a desirable level, i.e., less than about 25 mole percent.

As is usual in spinning operations, the extrusion speeds obtainable will depend upon the bath temperature, length of the bath, the particular composition of the polymer solution extruded, and the like. Normally, the operating conditions employed for each operation is a matter which can be readily determined by one skilled in the art.

In addition, the lactonized polymers of this invention can also be molded at suitable temperatures of about 200° C. to about 250° C. which produces a product which is hard, transparent, and has excellent physical strength.

The following examples are given by way of illustration of the manner in which the invention may be carried out, but not for limitation. Unless otherwise indicated, all percentages and parts in the examples are specified as mole percentages and parts by weight.

Figure 2:
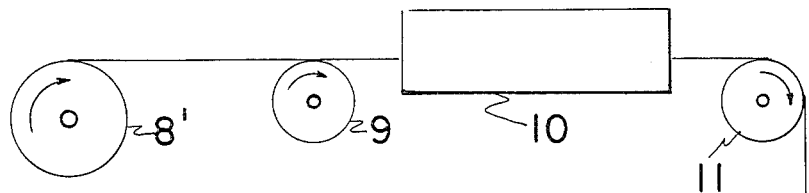

The accompanying drawing, FIGURES 1 and 2, illustrates schematically two stages of treatment for one embodiment of this invention directed to the spinning of solutions containing the second-stage, partially lactonized polymers of this invention. As shown in FIGURE 1, a spinning solution of the second-stage, partially lactonized polymer is extruded as a shaped structure as, for example, a filament, film or ribbon, through a shaped orifice of an extruder head 2 into a coagulating bath 3 suitably maintained at spinning temperatures by a heating exchanger means 4. The congealing structure is then passed through the bath over a series of guide rolls 5 and 6 for a sufficient length of travel to substantially congeal the structure, and then removed from the bath over a normally constant speed take-out roll 7 and to a wind-up reel 8 for storage and/or further treatment in accordance with this invention. Normally, since the collected product on the wind-up reel still contains substantial quantities of solvent, in order to insure against losses or modification of the product in storage, the collected, shaped structure is dried free of solvent as soon as is feasible after production thereof by heating to any suitable temperature not greater than about 200° C. The dried structure may then be stretched to improve the properties thereof.

As shown in FIGURE 2, the dried structure on reel 8 is orientated by passing it over a normally constant speed control-roll 9 and over a suitable heater 10, i.e. a heat plate, and a draw-roll 11 to a wind-up reel 12 for collection thereon. As is conventional, draw-roll 11 will be rotating at a higher speed than control-roll 9 so as to exert tension on the heated structures for the desired elongation thereof.

EXAMPLE I 100 parts of methacrolein was emulsion polymerized at 60–65° C. in 400 parts of water containing 2 parts of potassium persulfate and 3 parts of sodium lauryl sulfate (Duponol C). After four hours the polymerization was substantially complete to give a polymethacrolein having an inherent viscosity of about 0.3 dl./gm.

The resultant latex was reacted for three hours at 170–175° C. with 33 parts of sodium hydroxide in a pressure reactor to give a clear solution of poly(methyl propenol/sodium methacrylate). This solution was then acidified to a pH of 1 with a 20 percent hydrochloric acid solution which gave a white precipitate of partially lactonized poly(methyl propenol/methacrylic acid) containing about 25 percent of repeating lactone units, as defined above. The precipitate was separated from the liquid phase, washed and dried at 50° C.

The resultant partially lactonized poly(methyl propenol/methacrylic acid) was dissolved in dimethylformamide to a 20 percent solution.

A layer of the dimethylformamide solution was then evenly spread on a sheet of glass, and the solvent was evaporated therefrom at 150±5° C. for approximately three minutes. The dried film was then stripped from the glass sheet to provide a soft, pliable film of excellent optical properties and a tensile strength of about 8,000 p.s.i.

EXAMPLE II

Example I was repeated except that a series of the films was cast from a 20 percent solution of the lactonized polymer on a sheet of glass, the films dried at 150±5° C. for three minutes to provide final films of high optical properties which were stripped from the glass sheet.

A portion of the films, as formed (Nos. 1 to 11 of Table I below) was tested for physical properties, together with a second group of the films (Nos. 12 to 18 of Table I below) which was sprayed with various quantities of a commercial plasticizer (Santicizer 8) to determine the effect on elongation and tensile properties of the film. Results showed that the addition of plasticizers improved the elongation of the film, and had substantially no effect on tensile properties when the quantity of plasticizer is between 2 to 5 percent. The tensile properties of the films were reduced when 10 percent of the plasticizer was added. Results of variations in curing time and temperature of testing are also summarized in Table I.

TABLE I

| | | Drying | | Dimensions of Test Sample | | Test temp., °C. | Load, gms. | Elong., inches | Tensile strength, p.s.i. |
|---|---|---|---|---|---|---|---|---|---|
| | Percent plasticizer [1] | Time, mins. | Temp., °C. | Width, inches | Thickness ×10⁻³ cm. | | | | |
| Film No.: | | | | | | | | | |
| 1 | 0 | 3 | 150–155 | 1 | 1.2 | 24–25 | 1,600 | 0.055 | 7,453 |
| 2 | 0 | 3 | 150–155 | 1 | 1.5 | 24–25 | 2,060 | 0.065 | 7,680 |
| 3 | 0 | 3 | 150–155 | 1 | 1.2 | 65–66 | 1,120 | 0.13 | 5,216 |
| 4 | 0 | 3 | 150–155 | 1 | 1.6 | 65–66 | 1,450 | 0.17 | 5,066 |
| 5 | 0 | 3 | 150–155 | 1 | 1.6 | 24–25 | 1,910 | 0.04 | 8,071 |
| 6 | 0 | 3 | 150–155 | 1 | 1.4 | 24–25 | 1,770 | 0.032 | 7,618 |
| 7 | 0 | 3 | 150–155 | 1 | 1.0 | 24–25 | 1,130 | 0.03 | 6,322 |
| 8 | 0 | 5 | 150–155 | 1 | 0.9 | 24–25 | 1,110 | 0.036 | 6,894 |
| 9 | 0 | 5 | 150–155 | 1 | 1.1 | 24–25 | 1,460 | 0.03 | 7,419 |
| 10 | 0 | 5 | 150–155 | 1 | 1.1 | 64–65 | 1,080 | 0.74 | 5,488 |
| 11 | 0 | 5 | 150–155 | 1 | 0.9 | 65–66 | 810 | 0.11 | 5,031 |
| 12 | 10 | 3 | 150–155 | 1 | 1.3 | 24–25 | 78 | 0.06 | 3,353 |
| 13 | 10 | 3 | 150–155 | 1 | 1.6 | 24–25 | 1,030 | 0.054 | 3,598 |
| 14 | 5 | 3 | 150–155 | 1 | 1.1 | 24–25 | 1,340 | 0.05 | 6,809 |
| 15 | 5 | 3 | 150–155 | 1 | 1.1 | 24–25 | 1,380 | 0.052 | 7,013 |
| 16 | 5 | 3 | 150–155 | 1 | 1.6 | 24–25 | 1,790 | 0.066 | 6,254 |
| 17 | 2 | 3 | 150–155 | 1 | 1.1 | 24–25 | 1,240 | 0.06 | 6,301 |
| 18 | 2 | 3 | 150–155 | 1 | 1.3 | 24–25 | 1,420 | 0.055 | 6,106 |

[1] Commercial Santicizer 8.

EXAMPLE III 382.8 grams of methacrolein was emulsion polymerized at 50–52° C. in 1,600 grams of water containing 3.92 grams Duponol C. 4.0 mls. acetic acid and 160 mls. of 1 percent potassium persulfate solution. At the end of 6 hours the conversion was 91 percent complete, and the polymethacrolein coagulated and isolated.

140 grams of the resultant polymethacrolein was then reacted at 170° to 175° C. with 1,000 grams of a 4.4 percent sodium hydroxide solution in a Magna-Drive reactor to produce a corresponding clear solution of poly (methyl propenol/sodium methacrylate). The resultant solution was then acidified to a pH of 1 at 55° C. with 20 percent sulfuric acid to provide a lactonized precipitate of the free acid form of the polymer, which was readily separated by filtration and soluble in tetrahydrofuran. This free acid had an inherent viscosity in tetrahydrofuran of 0.33 at 40° C.

A 15 percent solution of the partial lactone polymer of the poly(methyl propenol/methacrylic acid) in tetrahydrofuran was cast coated on glass. After evaporation of the solvent, the dried film was further heated at 150° C. for one minute to a transparent film of high optical quality.

EXAMPLE IV 800 grams of methacrolein was emulsion polymerized at 65–70° C. in an aqueous medium comprising 4,000 mls. of water, 24 grams of sodium lauryl sulfate (Duponol C) and 800 mls. of a 2% solution of potassium persulfate. After one hour, the conversion of the methacrolein to polymethacrolein was 97.7%.

Polymethacrolein was isolated from a portion of the latex formed, and was found to have an inherent viscosity of 0.1811 in dimethylformamide at 29° C.

EXAMPLE V

A portion of the latex of Example IV containing 140 grams of polymethacrolein was reacted in a pressure vessel with 44 grams of sodium hydroxide at 170–175° C. for three hours. The resultant solution of poly(methyl propenol/sodium methacrylate) was heated to 45° C. and then acidified with 20 percent sulfuric acid to a pH of about 1. The resultant partially lactonized polymer of poly(methyl propenol/methacrylic acid) was separated, washed and dried. The isolated polymer had an acid number of 2.18 meg. of sodium hydroxide per gram of the polymer. The isolated product also contained 66 mole percent of the repeating lactone units, as defined above.

EXAMPLE VI 280 grams of polymethacrolein was prepared in accordance with the procedure therefor set forth in Example I. The polymethacrolein so obtained was reacted at 170–175° C. for three hours with 2,000 mls. of a 4.4 percent sodium hydroxide solution in a Magna-Drive reactor to obtain a clear solution of poly(methyl propenol/sodium methacrylate) polymer.

The solution of poly(methyl propenol/sodium methacrylate) was heated to 50° C. and acidified with 20 percent sulfuric acid to a pH of about 1. After cooling to room temperature, the precipitated, partially lactonized poly(methyl propenol/methacrylic acid) was separated from the liquid phase, washed and dried. This resultant polymer had a softening point of 178–185° C. and was soluble in tetrahydrofuran and dimethylformamide.

EXAMPLE VII

Several batches of like solutions of poly(methyl propenol/sodium methacrylate) were prepared in accordance with the procedure of Example V, and equal volumes of each batch were lactonized with equivalent quantities of sulfuric acid, with the exception that the acidification was carried out at different temperatures. Results of the variation in the acidification temperatures are set forth below in Table II.

TABLE II

| Batch No.: | Acidification Temperature, ° C. | Mole Percent Lactone [1] |
|---|---|---|
| 1 | 0–5 | 73.4 |
| 2 | 0–5 | 69.0 |
| 3 | 24–25 | 25.1 |
| 4 | 43–50 | 42.6 |
| 5 | 50–55 | 51.9 |
| 6 | 70–75 | 66.0 |
| 7 | 99–100 | 78.8 |
| 8 | 99–100 | 76.6 |

[1] Repeating lactone units having the structure:

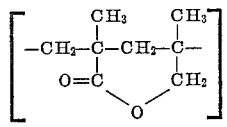

EXAMPLE VIII 280 parts by weight of a powdered polymethacrolein having an inherent viscosity of 0.18 was reacted at 170–175° C. with 2,000 parts of a 4.4 percent aqueous solution of sodium hydroxide under a nitrogen atmosphere to give a colorless solution.

The resultant solution of poly(methyl propenol/sodium methacrylate) was acidified to a pH of 1 at 25° C. with 20 percent concentrated hydrochloric acid, and the precipitate was separated, washed and dried.

The resultant lactonized poly(methyl propenol/methacrylic acid) was dissolved in dimethylformamide to a 20 percent solution.

A layer of dimethylformamide solution was then evenly spread on a sheet of glass, and the solvent evaporated therefrom at about 150° C. The dried film was stripped from the glass sheet to provide a film of outstanding optical properties and tensile strength of about 8,000 p.s.i.

EXAMPLE IX

A solution containing 20 percent of the lactonized polymer was prepared as in Example VIII, and a stream of the solution was extruded through a 0.005 inch diameter orifice into and through a water bath maintained at room temperature. The extrudate congealed into a white fiber containing residual solvent which, upon removal from the bath, was immediately placed in an oven and dried at 150–155° C. for a few minutes until a dry transparent fiber was obtained.

Various samples of dried 0.005 inch diameter filament obtained in this example were then orientated by softening them over a hot plate maintained at 100 to 110° C., and then elongated carefully. These cured filament samples could be elongated anywhere between 150 to 200 percent of their initial length, and the elongated fibers could be contracted by 75–100 percent upon heating, with the percent contraction depending on the extent of initial elongation and the temperature at elongation. The orientated, cured fibers soften and shrink between 95 to 115° C. whereas the unorientated, cured fibers remain unaffected at this range. X-ray analysis showed that both the unorientated and orientated fibers were noncrystalline. The test conditions at room temperature and results are given in Table III. Testing of the fibers at 100° C. for tensile strengths produced elongation of up to 100 to 150 percent of the initial length of both the orientated and unorientated fibers.

TABLE III

| Number: | Diameter ×10⁻³ in. | Area 10⁻⁶ in.² | Temp. of test, ° C. | Elong., inches | Load, gms. | Tensile strength, p.s.i. |
|---|---|---|---|---|---|---|
| 1 | 2.5 | 4.906 | R.T | 0.28 | 96 | 43.107 |
| 2 | 2.0 | 3.14 | R.T | 0.128 | 68 | 47.719 |
| 3 | 3.0 | 7.06 | R.T | 0.25 | 93 | 28.993 |
| 4 | 2.0 | 3.14 | R.T | 0.04 | 74 | 51.930 |
| 5 | 4.0 | 12.56 | R.T | 0.24 | 145 | 25.430 |
| 6 | 5.0 | 19.62 | R.T | 0.066 | 123 | 13.809 |

Although the invention has been described with reference to specific materials, embodiments and details, various modifications, within the invention, will be apparent to one skilled in the art and are contemplated to be embraced within the invention.

What is claimed is:

1. A partially lactonized polymer of poly(methyl propenol/methacrylic acid) polymer substantially free of aldehyde and acetal groups and consisting essentially of:
   (a) about 5 to about 40 mole percent of repeating units of the structure

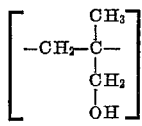

(b) about 5 to about 40 mole percent of repeating units of the structure

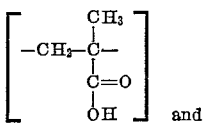 and (c) about 20 to about 90 mole percent of repeating units of the structure

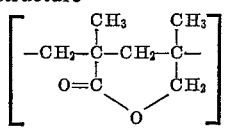

said polymer having an inherent viscosity in the range of about 0.1 to about 3.0, and characterized by freedom of exposure to temperatures above about 200° C.

2. A film consisting essentially of the polymer of claim 1.

3. A solution consisting essentially of the polymer of claim 1, dissolved in a volatile organic solvent selected from the group consisting of dimethylformamide, tetrahydrofuran, the monoalkyl ethers of diethylene glycol, the dialkyl ethers of diethylene glycol, the monoalkyl ether acetates of diethylene glycol, and the dialkyl acetates of diethylene glycol.

4. The polymer of claim 1 wherein said polymer is further characterized as being soluble in tetrahydrofuran.

5. A method of preparing partially lactonized polymers substantially free of aldehyde and acetal groups and containing the repeating units having the structures

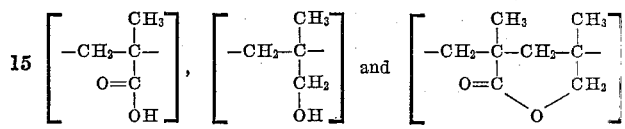

consisting essentially of forming an intermediate polymer by reacting polymethacrolein with a water soluble base at a pH of above about 8, at a temperature of at least about 125° C.; reacting said intermediate polymer with a mineral acid at a temperature of at least about 30° C. to form said partially lactonized polymer.

References Cited

FOREIGN PATENTS 803,053 10/1958 Great Britain.
904,392 8/1962 Great Britain.

WILLIAM H. SHORT, Primary Examiner

L. M. PHYNES, Assistant Examiner

U.S. Cl. X.R.

260—31.6, 32.6, 33.2, 67, 78.3; 264—178